United States Patent [19]
Schroeder et al.

[11] 3,727,136
[45] Apr. 10, 1973

[54] AUTOMATIC EQUALIZER FOR PHASE-MODULATION DATA TRANSMISSION SYSTEMS

[75] Inventors: Henry Charles Schroeder, East Brunswick; John Robert Sheehan, Red Bank, both of N.J.; Robert John Tracey, Belmont, Calif.

[73] Assignee: Bell Telephone Laboratories, Incorporated, Murray Hill, N.J.

[22] Filed: Nov. 17, 1971

[21] Appl. No.: 199,693

[52] U.S. Cl. ........................ 325/320, 178/67, 178/88, 325/42, 325/324, 325/325, 325/326, 333/18, 333/28
[51] Int. Cl. .............................................. H04b 1/12
[58] Field of Search ...................... 325/42, 60, 30, 65, 325/320, 321–326, 473–476; 333/78, 28, 70 T; 235/181; 179/15 BC; 178/67, 88

[56] References Cited

UNITED STATES PATENTS 3,400,332 9/1968 O'Neill et al. .......................... 325/65

*Primary Examiner*—Albert J. Mayer
*Attorney*—R. J. Guenther et al.

[57] ABSTRACT

An adaptive transversal equalizer for phase-modulated data transmission systems employs a tapped delay line provided with separate in-phase and quadrature sets of weighting attenuators operating on time spaced samples of passband signals appearing at each tap. The two sets of selectively attenuated tap signals are then combined to form the equalized output signal. Control signals for adjusting the respective sets of weighting attenuators according to a zero-forcing algorithm are derived solely from the phase differences among adjacent and nonadjacent received signal samples.

9 Claims, 12 Drawing Figures

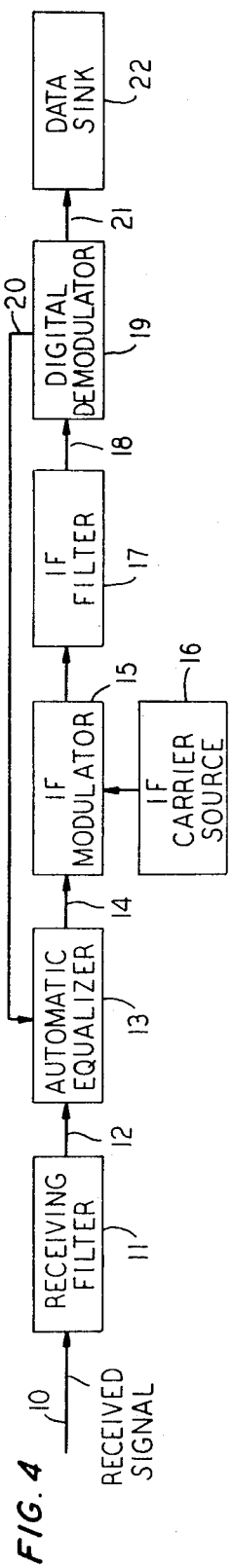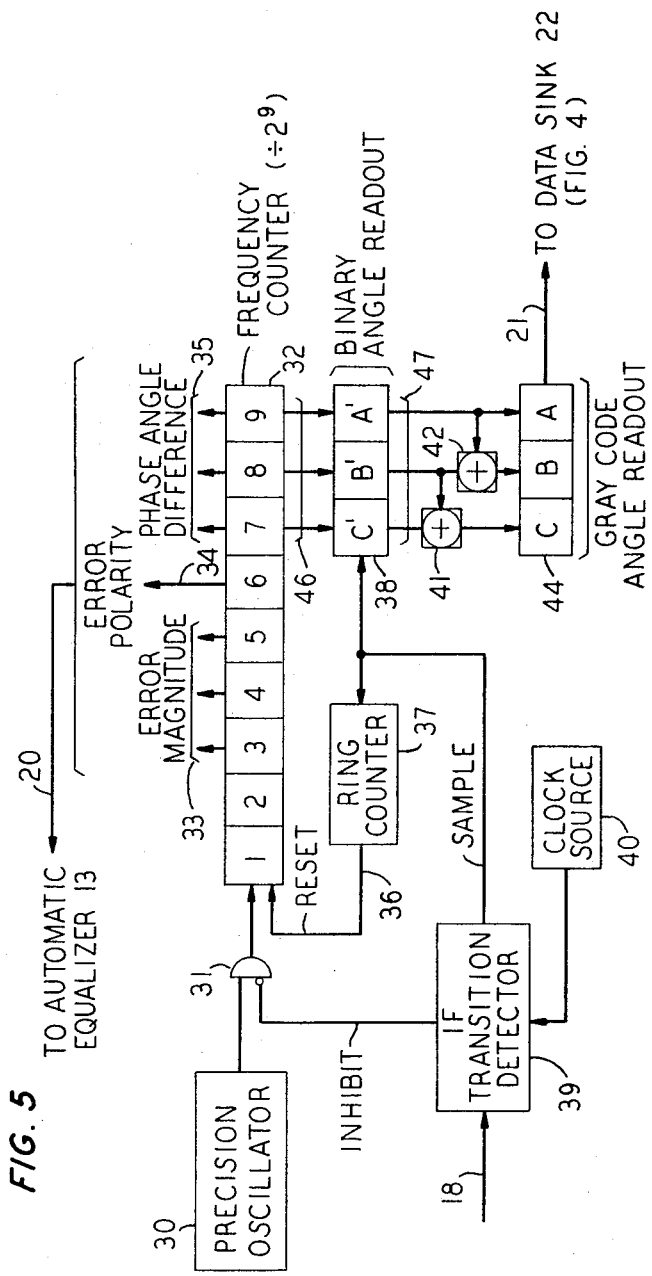

FIG. 6

BINARY PHASE CHANGE CODE

| CODE FOR POSITIVE ANGLES | DIFFERENTIAL PHASE ANGLE | CODE FOR NEGATIVE ANGLES |
|---|---|---|
| 0 0 0 0 0 0 0 0<br>0 0 0 0 0 0 0 1 | 0° | 0 0 0 0 0 0 0 0<br>1 1 1 1 1 1 1 1 |
| 0 0 0 0 1 1 1 1<br>0 0 0 1 0 0 0 0<br>0 0 0 1 0 0 0 1 | 22.5° | 1 1 1 1 0 0 0 1<br>1 1 1 1 0 0 0 0<br>1 1 1 0 1 1 1 1 |
| 0 0 0 1 1 1 1 1<br>0 0 1 0 0 0 0 0<br>0 0 1 0 0 0 0 1 | 45° | 1 1 1 0 0 0 0 1<br>1 1 1 0 0 0 0 0<br>1 1 0 1 1 1 1 1 |
| 0 0 1 0 1 1 1 1<br>0 0 1 1 0 0 0 0<br>0 0 1 1 0 0 0 1 | 67.5° | 1 1 0 1 0 0 0 1<br>1 1 0 1 0 0 0 0<br>1 1 0 0 1 1 1 1 |
| 0 0 1 1 1 1 1 1<br>0 1 0 0 0 0 0 0   READ DOWN ↓<br>0 1 0 0 0 0 0 1 | 90° | READ UP ↑  1 1 0 0 0 0 0 1<br>1 1 0 0 0 0 0 0<br>1 0 1 1 1 1 1 1 |
| 0 1 0 0 1 1 1 1<br>0 1 0 1 0 0 0 0<br>0 1 0 1 0 0 0 1 | 112.5° | 1 0 1 1 0 0 0 1<br>1 0 1 1 0 0 0 0<br>1 0 1 0 1 1 1 1 |
| 0 1 0 1 1 1 1 1<br>0 1 1 0 0 0 0 0<br>0 1 1 0 0 0 0 1 | 135° | 1 0 1 0 0 0 0 1<br>1 0 1 0 0 0 0 0<br>1 0 0 1 1 1 1 1 |
| 0 1 1 0 1 1 1 1<br>0 1 1 1 0 0 0 0<br>0 1 1 1 0 0 0 1 | 157.5° | 1 0 0 1 0 0 0 1<br>1 0 0 1 0 0 0 0<br>1 0 0 0 1 1 1 1 |
| 0 1 1 1 1 1 1 1<br>1 0 0 0 0 0 0 0 | 180° | 1 0 0 0 0 0 0 1<br>1 0 0 0 0 0 0 0 |

A' B' C' ↑
8φ DATA | ERROR MAGNITUDE
ERROR BIT

A' B' C' ↑
8φ DATA | ERROR MAGNITUDE
ERROR BIT

PATENTED APR 10 1973          3,727,136
SHEET 4 OF 5
FIG. 7a    $f_{IF} = f_{LC} + f_C$
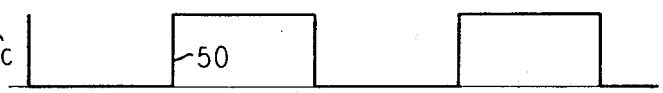
FIG. 7b    $f_{OSC} = 2^m f_{IF}$
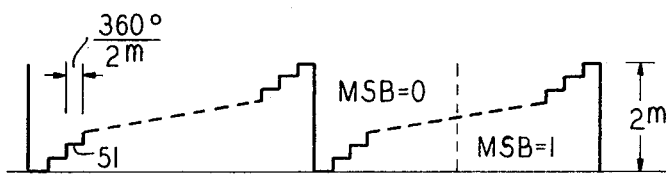
FIG. 9
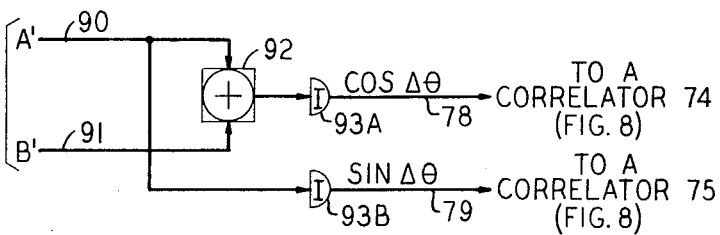
FIG. 10
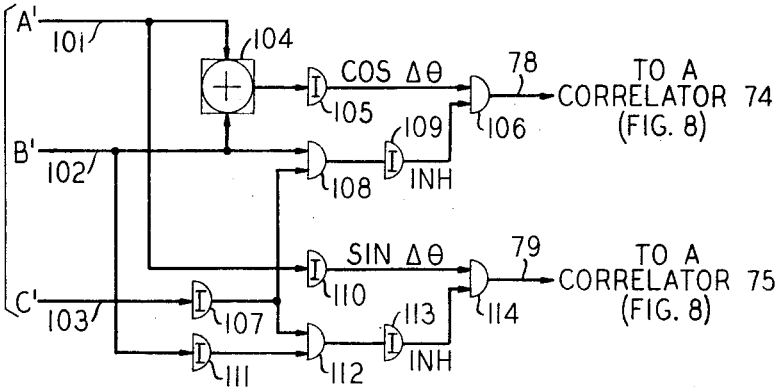
FIG. 11
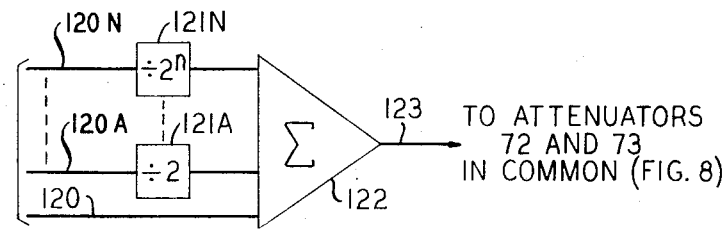

AUTOMATIC EQUALIZER FOR PHASE-MODULATION DATA TRANSMISSION SYSTEMS

FIELD OF THE INVENTION

This invention relates to the correction of the distorting effects of transmission media of limited frequency bandwidth on digital data signals and in particular to the rapid automatic equalization of phase-modulated data signals.

This application is related to an application Ser. No. 199,694 filed Nov. 17, 1971 concurrently herewith by H. C. Schroeder and J. R. Sheehan and entitled "Digital Demodulator for Phase-Modulated Data Transmission Systems."

BACKGROUND OF THE INVENTION

Equalization is here defined as the compensation of a communication channel for distorting amplitude and delay characteristics by means of an adjustable device whereby the resultant composite characteristics become substantially constant in amplitude and linear in phase over a chosen frequency band. Equalization of communication channels for single-sided or baseband amplitude-modulated signals has been accomplished automatically in accordance with the teachings of F. K. Becker et al. U.S. Pat. No. 3,292,110 issued Dec. 13, 1966 by means of the transversal time-domain filter. These teachings have been extended to the equalization of dual-channel signals amplitude modulated on quadrature phases of a single carrier wave in J. F. O'Neill, Jr. et al. U. S. Pat. No. 3,400,332 issued on Sept. 3, 1968. In the latter patent staggered interchannel timing was employed to minimize interchannel interference. These prior-art equalizers for amplitude-modulation channels operate satisfactorily as long as linear relationships are preserved at all times in the modulation process.

A phase-modulated line signal is a nonlinear function of the modulating baseband signal. As a result equalization of phase-modulated baseband signals cannot be accomplished through amplitude control alone. The additional parameter of phase must be taken into account. True phase modulation differs from prior art amplitude-modulated quadrature channel systems in which staggered timing between channels was sufficient to avoid interchannel interference. Attenuator incrementation in accordance with independent zero-level slicing operations on the demodulated outputs of the respective quadrature channels was possible. However, because of the nonlinear relationship between demodulated data and carrier phase in truly phase-modulated systems, there is no direct relationship between the polarity of demodulated data and channel distortion.

It is an object of this invention to provide for adaptive automatic equalization of phase-modulated data transmission systems.

It is another object of this invention to adapt the transversal filter to the equalization of phase-modulated data transmission systems.

It is a further object of this invention to control an automatic equalizer adaptively from the differences in phase existing between successive phase-modulated data signals.

SUMMARY OF THE INVENTION

The above objects and others are accomplished according to this invention in a transversal filter structure having a delay line with a plurality of synchronously spaced taps, a pair of adjustable attenuators at each tap on the delay line, combining means for signals from each of two groups of attenuators and 90° broadband phase shifting means splitting one group of attenuator signals from the other. The signal traversing the equalizer is the passband line signal on which the transmitted data are encoded in the phase of the carrier wave either coherently of differentially. A substantially constant phase is maintained during each signaling interval. The adjustment of respective attenuators is effected according to a zero-forcing algorithm through the medium of control signals derived from actual measured phase changes between nonadjacent as well as adjacent synchronously sampled received signals. The error to be minimized is selected as the signed difference between the actual change in phase angle between adjacent samples and the nearest discrete permitted change. This error is in turn correlated with the sines and cosines of the phase angle differences measured at each sampling instant not only between adjacent signaling intervals but also between nonadjacent signaling intervals to form respective in-phase and quadrature tap attenuator control signals. In order to obtain phase angle differences between nonadjacent samples and to control both leading and lagging distortion with respect to a given sampling instant, it is necessary to store a plurality of consecutive measured phase changes and to select a particular past phase change as a time reference relative to those distortion elements regarded as leading and lagging.

Although the invention is susceptible to implementation on an analog basis, digital implementation is to be preferred because of its precision and flexibility with respect to baud rate and the number of allowable phase changes. Accordingly, the illustrative embodiment employs a digital demodulator, more fully described in the copending application cited above, an up modulator to multiply the number of zero crossings per signaling interval and to demodulate the phase angle changes and differences as multibit digital numbers, rather than analog values. In this way each signaling or baud interval is provided with a zero crossing near its center instead of having a single zero crossing at baseband range across the entire baud interval, and further, the possible 360° of phase change are subdivided into hundreds of digital counts so that the phase change and its departure from allowable changes is precisely identified and encoded in a readily storable form.

Once the phase change is encoded as a digital word the most significant digit positions or bits automatically yield the permitted angle itself, another bit encodes the error direction of the departure of the measured angle from an allowable one, and the remaining bits represent the error magnitude. Furthermore, relatively straightforward logical manipulation of the most significant bits results in quantizations of the sine and cosine functions of the phase angle changes and differences. The availability of error magnitude bits makes possible more flexible control of the tap attenuators by proportioning increments of attenuator adjustment to the magnitude of the error.

It is a feature of this invention that a nonlinear modulation system is equalized at passband level before demodulation of message data from control information derived in the demodulation process.

It is another feature of this invention that equalizer control information in a phase modulation data transmission system is obtained from differential phase measurement alone without the necessity of generating a demodulating carrier wave from transmitted pilot tones.

It is yet another feature of this invention that only the polarity of the error is necessary for equalization of a nonlinear phase modulation data transmission system.

It is still another feature of this invention that the magnitude of the error is also made available for either proportional or gear-shift control of tap attenuator settings.

DESCRIPTION OF THE DRAWINGS

The above objects and features of this invention will be appreciated more fully from a consideration of the following detailed description and the drawing in which:

FIG. 4 is a block diagram of a receiver for a differential phase-modulated data transmission system including an equalizer according to this invention;

FIG. 5 is a block diagram of a digital demodulator for a differentially encoded phase modulation data transmission system;

FIG. 6 is an abbreviated tabular presentation in binary code of the differential phase angles demodulated in a phase-modulated data transmission system to which this invention is applicable;

FIG. 7a and b are waveform diagrams showing two cycles of the up modulated intermediate-frequency wave occurring in a typical signal baud interval and a digital subdivision of such a wave to facilitate phase angle measurement, respectively;

FIG. 9 is a logic diagram of a calculator approximating sine and cosine functions of digitally encoded phase angles which are odd multiples of 22.5 electrical degrees;

FIG. 10 is a logic diagram of a calculator approximating sine and cosine functions of digitally encoded phase angles which are even multiples of 22.5 electrical degrees; and FIG. 11 is a block diagram of a circuit for obtaining the absolute magnitude of the differential phase error for use in proportional control of equalizer weighting attenuators.

DETAILED DESCRIPTION

Figure 1:
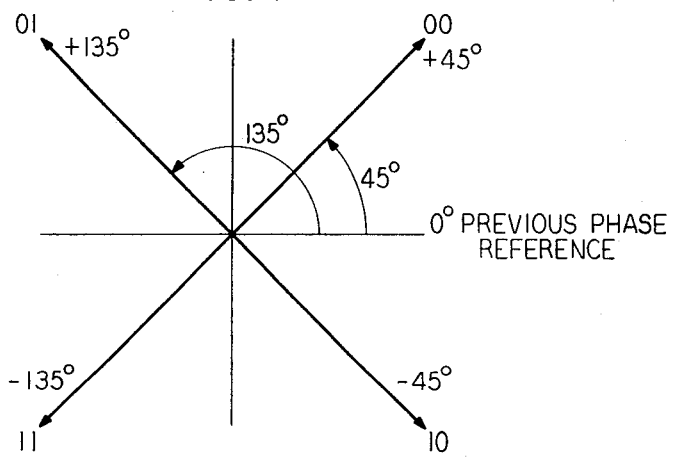
FIG. 1 is a phase vector representation of the signal encoding employed in a four-phase differentially encoded phase-modulated data transmission system.

Reference is made to Chapter 10 of Data Transmission by W. R. Bennett and J. R. Davey (McGraw-Hill Book Company, 1965) for details of the differential encoding of serial binary data in dibit pairs on four phases (FIG. 10–1, page 202) and in tribit threesomes on eight phases (FIG. 10–2, page 202) of a carrier wave of fixed frequency. Briefly, for four-phase modulation serial data bits to be transmitted are paired into dibits and through appropriate logic circuitry discrete phase changes in the carrier wave are generated in odd multiples of 45 electrical degrees according to the scheme such as is shown in FIG. 1. The existing phase is taken as the reference phase in each case. The dibits 00 and 10 are respectively encoded as plus and minus 45°, while dibits 01 and 11 are encoded as plus and minus 135°. A phase change occurs for every signaling or baud interval, thus simplifying timing recovery. Due to the differential encoding errors are not cumulative and no pilot tones need be transmitted to achieve demodulation. The coding selected is such that the first or A bit of a dibit is demodulated by determining whether the latest phase change leads or lags the prior phase, and the second or B bit of the dibit is demodulated by determining whether the latest phase change leads or lags a phase which is in quadrature with the prior phase.

It will be understood that the coding can also be arranged such that the allowable phase angles are multiples of 90°. In this case there would be no phase change for repetition of one of the code assignments.

Figure 2:
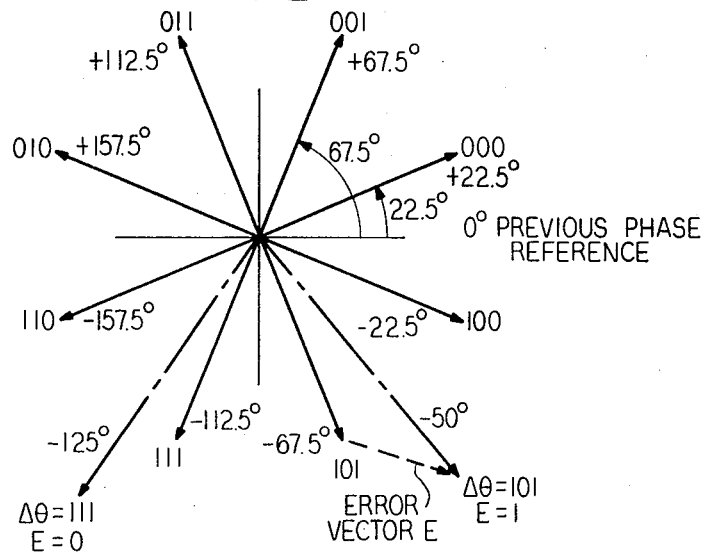
FIG. 2 is a phase vector representation of the signal encoding employed in an eight-phase differentially encoded phase-modulated data transmission system.

FIG. 2 is a vector diagram similar to FIG. 1 for eight-phase modulation. Here three serial bits are taken at a time and encoded as phase changes which are odd multiples of 22.5°. (Multiples of 45° can be used, if it is not necessary to provide a phase change for a repetition of one of the codes.) Thus, the tribits 000 and 100 are encoded as plus and minus 22.5°; 001 and 101, as plus and minus 67.5°; and so forth. It will be observed that the eight-phase digital encoding of FIG. 2 is compatible with four-phase encoding of FIG. 1 in that the most significant A and B bits are encoded in the same quadrants and the third C bit is simply added on to the four-phase code. It is apparent that the scheme can be extended to more levels, i.e., more bits per phase change. In the illustrated eight-phase encoding the A and B bits are decoded with respect to the in-phase and quadrature axes in the same manner as four-phase encoding. The C bit is derivable from plus and minus 45° references determined with respect to the prior phase.

FIG. 2 further shows that the addition of a further bit to the ABC pattern encoding the allowable phase changes can be used to depict an error direction. For example, consider an actual observed phase of minus 50°, as indicated in the fourth quadrant by the broken line vector. This received vector (assuming conventional counterclockwise vector rotation) leads the closest allowable vector 101 at minus 67.5° and can thus be assigned an error direction of "1". Similarly, an observed vector at minus 125° in the third quadrant lags the nearest allowable vector 111 encoded as minus 112.5° and can therefore be assigned an error direction of "0". This scheme is used in the practice of this invention.

It may further be noted that the counterclockwise progression of encoding bits is in accordance with the Gray cyclic code, in which there is only one bit change between consecutive codes. This selection is known to reduce decision errors and also to reduce decoding to successive slicing and folding operations.

Figure 3:
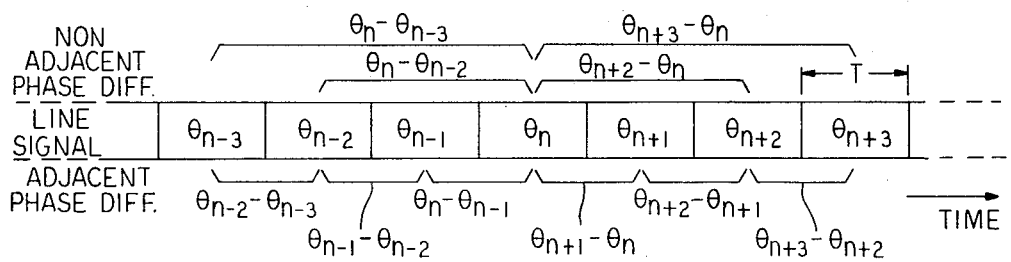
FIG. 3 is a line signal timing diagram useful in the explanation of the principle of the invention.

FIG. 3 is a line signal timing diagram extending over seven consecutive baud intervals. For the duration of each such interval the absolute phase angle of the carrier wave is held as nearly constant as possible. Between baud intervals the phase is changed by one of the allowable discrete amounts. For purposes of illustration the center interval in which the carrier phase $\theta_n$ is being transmitted is regarded as occurring at the present time. Past time is to the left, where phase angles $\theta_{n-1}$, $\theta_{n-2}$ and $\theta_{n-3}$ are shown. Future time lies to the right, where phase angles $\theta_{n+1}$, $\theta_{n+2}$, and $\theta_{n+3}$ are shown. The present phase change on which the present signal group is encoded is determined by the phase difference $\theta_n - \theta_{n-1}$. Other signal groups are similarly demodulated from adjacent phase changes, such as $\theta_{n-1} - \theta_{n-2}$ and $\theta_{n+1} - \theta_n$. The adjacent phase changes are diagrammed by the slurs connecting adjacent baud intervals at the bottom of the diagram. Just above the timing diagram appear two additional pairs of slurs indicating the phase differences between the present phase $\theta_n$ and nonadjacent phases. These phase differences are obtained from the addition of appropriate adjacent phase changes and are used to correlate with a present error signal to obtain control signals for adjustment of equalizer tap attenuators, as will be explained more fully below. By way of example, the nonadjacent phase difference $\theta_n - \theta_{n-2}$ is obtained by the addition of phase changes $(\theta_n - \theta_{n-1})$ and $(\theta_{n-1} - \theta_{n-2})$.

FIG. 4 is a block diagram of a receiver for a multiphase data transmission system including an automatic equalizer according to this invention. Multiphase will be understood to mean more than two phases.

The receiver of FIG. 4 comprises receiving filter 11, automatic equalizer 13, intermediate-frequency carrier source 16, intermediate-frequency modulator 15, intermediate-frequency filter 17, digital demodulator 19 and data sink 22. A feedback path 20 is provided between demodulator 19 and equalizer 13. The received signal on input lead 10 is of the type described in connection with FIG. 1, 2, and 3. Typically the carrier wave being modulated is at the frequency of 1800 Hz for telephone voiceband transmission. This frequency lies near the point of minimum delay distortion. Receiving filter 11 helps to define the signal passband and screens out-of-band noise from the remainder of the receiver. Inasmuch as the baud rate usually chosen — 1000, 1200 or 1600 — is comparable to the carrier frequency, there are fewer than two cycles per baud available for encoding. In order to increase the precision with which phase changes can be determined, $i$–$f$ carrier source 16 is provided to modulate the received signal carrier wave upward in frequency to increase the number of cycles per signaling interval. In practice, up modulation by a factor of nine has been selected. Thus, a local $i$–$f$ wave of frequency $f_{LC} = 14.4$ kHz up modulates a received carrier wave of frequency $f_C = 1800$ Hz to a new frequency $f_{IF} = 16.2$ kHz in $i$–$f$ modulator 15. In the translation process the voiceband message signal becomes double sided and filter 17 is required to suppress the lower sideband, in this case at 12.6 kHz. It can be shown that the up modulation makes no change in the relative phase between adjacent baseband and translated carrier waves. Now there are available nine times as many zero crossings per baud so that sampling can take place near the center of each baud interval.

Digital demodulator 19 determines the changes in phase from baud to baud as parallel multidigit binary numbers and delivers these readily storable numbers to equalizer 13. The most significant bits are also Gray coded and serialized to form the data output of the demodulator. In the absence of transmission errors, the serialized output corresponds to the transmitted data.

Digital demodulator 19 is shown in more detail in FIG. 5 and comprises precision oscillator 30, AND-gate 31, multistage frequency divider 32, clock source 40, transition detector 39, ring counter 37, and shift registers 38 and 44. Precision oscillator 30 generates a stable frequency equal to $2^m$ times $f_{LC}$, where $m$ is the number of binary counter stages in frequency divider 32. In the illustrative embodiment $m = 9$, $2^m = 512$, $f_{LC} = 16.2$ kHz and the frequency of oscillator 30 is 16.2 kHz times $512 = 8.2944$ MHz. A wave of this frequency operated on by successive frequency counter stages provides a series of synchronized square waves all related to each other by powers of two. The lowest frequency square wave is shown as waveform 50 in FIG. 7 at the frequency $f_{LC}$. The binary readout of all the divider stages can be diagrammed as the staircase wave 51 of FIG. 7 when all divider stages are triggered by the negative-going transition in the output of its predecessor. The count farthest to the right is the most significant bit (MSB). Since the lowest frequency in the counter chain is the same as the intermediate frequency, in effect each cycle of the intermediate frequency is being divided into 512 equal parts. Furthermore, at half the full count MSB changes from "0" to "1", equivalent to 180° of phase change. At 90° intervals the second MSB changes state, and at 45° intervals the third MSB changes state. Accordingly, the three most significant bits can be used advantageously as a phase angle measure in a binary format related to the vector diagram of either of FIG. 1 and 2. Furthermore, the next digit can represent the sign of the angular error and the remaining bits, the magnitude of the error.

In order to utilize the circuit of FIG. 5 as a digital demodulator for phase modulated signals, clock source 40, synchronized by conventional means with the baud rate, keys transition detector 39 to pass a portion of the $i$–$f$ wave on input lead 18 and to inhibit the output of oscillator 30 by way of AND-gate 31. On the first transition thereafter in the received wave a sample pulse is generated on the sample lead and the three most significant bits are registered over leads 46 in stages A', B', and C' of binary register 38. The sample pulse after a predetermined count in ring counter 37 resets all the stages of divider 32 by way of reset line 36 to the proper count since the occurrence of the data transition. Thus, the count readable from the outputs of counter 32 at any instant is in phase with the $i$–$f$ burst of the previous baud interval and the count observed at the next sampling instant is a measure of the phase change between adjacent baud intervals.

Further details of the digital demodulator are disclosed and claimed in the aforementioned copending patent application.

The binary phase change code is shown in detail in FIG. 6. The binary numbers increase downwardly in the left column to encode positive angles and continue increasing upwardly in the right column to encode negative angles. The all-zero count is assigned to the zero phase-angle difference. If four-phase data were being transmitted the third most significant bit would represent the error sign. FIG. 6 is believed to be self-explanatory.

The original data were encoded in the Gray cyclic code. It is a straightforward matter to transfer the binary readout A'B'C' in register 38 of FIG. 5 to the cyclic code since each Gray bit, except the most significant, is the modulo-two sum of the binary bits of the same and next lower orders. The most significant bits are the same in both codes. Accordingly, exclusive-OR gates 41 and 42 couple the lower order stages of binary register 38 to Gray register 44. Gate 42 performs modulo-two addition of the A' and B' bits to form the B bit of the Gray code. Similarly, gate 41 adds bits B' and C' modulo-two to form Gray bit C. The Gray code word in register 44 can then be shifted serially from register 44 over lead 21 to data sink 22.

A brief analysis of the phase-modulated data signal aids in the understanding of the principle of this invention. A single data pulse transmitted as a phase-shift signal has the form $$s_0(t) = \rho_0 f(t) \cos(\omega_c t + \theta_0), \quad (1)$$

where
$\rho_0$ = pulse amplitude,
$f(t)$ = pulse shaping factor,
$\omega_c$ = carrier radian frequency, and
$\theta_0$ = phase angle on which signal is encoded.

By the trigonometric identity relating the cosine of the sum of angles to the difference between the products of cosines and sines of the individual angles, equation (1) can be transformed into $$s_0(t) = a_0 f \kappa \text{ and}$$

where
$a_0 = \rho_0 \cos \theta_0$ and
$b_0 = \rho_0 \sin \theta_0$.

The terms $a_0 f(t) \cos \theta_0$ and $b_0 f(t) \sin \theta_0$ in equation (2) are the respective in-phase and quadrature components of the transmitted pulse.

It can be shown that the transmission of a pulse in the form of equation (2) through a transmission channel whose amplitude response with frequency is not flat and whose phase response is not linear results in a received signal of the form $$s_0'(t) = \rho_0 R(t) \cos[\omega_c t + \theta_c + \theta_0 + \phi(t)], \quad (3)$$

where $R(t)$ = envelope of received signal,
$\phi(t)$ = phase shift imparted by channel, and
$\theta_c$ = carrier reference phase.

Equation (3) can be further transformed using trigonometric identities to $$s_0'(t) = [a_0 g(t) - b_0 h(t)] \cos(\omega_c t + \theta_c) - [a_0 h(t) + b_0 g(t)] \sin(\omega_c t + \theta_c), \quad (4)$$

where $g(t) = R(t) \cos\phi(t)$ and
$h(t) = R(t) \sin\phi(t)$.

The functions $g(t)$ and $h(t)$ in equation (4) are the in-phase and quadrature components of the system pulse response.

A pulse generated at any other synchronous instant $nT$, where $n$ is any position or negative integer and $T$ is the baud interval can be represented in form similar to equations (1) and (2) as $$s_n(t) = \rho_n f(t-nT)\cos(\omega_c t + \theta_n) = a_n f(t-nT)\cos\omega_c t - b_n f(mT)\sin\omega_c t \quad (5)$$

Equivalently, an isolated nth encoded pulse is received in a form similar (assuming $\omega_c nT = 2n\pi$) to equations (3) and (4) as $$s_n'(t) = \rho_n R(t-nT)\cos[\omega_c t + \theta_c + \theta_n + \phi(t-nT)] = [a_n g(t-nT) - b_n h(t-nT)]\cos(\omega_c t + \theta_c) - [a_n h(t-nT) + b_n g(t-nT)]\omega_c t + \theta_c). \quad (6)$$

When pulses are transmitted in sequence at synchronous instants the total received signal is the summation of a plurality of terms of the form of equation (6). Thus, $$s'(t) = \sum_{n=-\infty}^{\infty} \rho_n R(t-nT) \cos[\omega_c t + \theta_n + \phi(t-nT)\theta_0]$$

$$= a'(t) \cos(\omega_c t + \theta_0) - b'(t) \sin(\omega_c t + \theta_0) \quad (7)$$

where $$a'(t) = \sum_{n=-\infty}^{\infty} a_n g(t-nT) - \sum_{n=-\infty}^{\infty} b_n h(t-nT)$$

and $$b'(t) = \sum_{n=-\infty}^{\infty} a_n h(t-nT) + \sum_{n=-\infty}^{\infty} b_n g(t-nT)$$

Each of the in-phase and quadrature received signal components is seen to include crosstalk elements from the other component.

The received signal of equation (7) is recovered by sampling at synchronous instants $kT$, where $k$ is any integer. The results for the respective in-phase and quadrature samples are $$a'(t_0 + kT) = \sum_{n=-\infty}^{\infty} a_n g_{k-n} - \sum_{n=-\infty}^{\infty} b_n h_{k-n} \quad (8)$$

and $$b'(t_0 + kT) = \sum_{n=-\infty}^{\infty} a_n h_{k-n} + \sum_{n=-\infty}^{\infty} b_n g_{k-n} \quad (9)$$

Intersymbol interference is eliminated when $$g_{k-n} = 0 \text{ for } k \neq n, \text{ and} \quad (10)$$

$$h_{k-n} = 0 \text{ for all values of } k. \quad (11)$$

An equalizer which operates to satisfy equations (10) and (11) will substantially eliminate intersymbol interference. As in the baseband case, equalization can be accomplished by adding to the received signal represented by equation (7) echoes spaced apart by multiples of the baud interval T. Unlike the baseband case, however, these echoes must be controlled in phase as well as amplitude. The conventional delay line, when used at passband, produces echoes with fixed phase determined by the phase shift imparted at carrier frequency by the transmission channel. In principle a broadband phase splitter at each tap of the delay line is required so that a variable resistive attenuator at each phase splitter output can control both phase and amplitude of the echoes. In practice it has been found that a single phase splitter is sufficient when applied to the combined outputs of attenuators controlled by quadrature errors.

Equations (8) and (9) can be rewritten to show the interference components separately as follows:

$$a_n' = a_n + \sum_{k \neq n} a_k g_{n-k} - \sum_{k=-\infty}^{\infty} b_k h_{n-k} \quad (12)$$

$$b_n' = b_n + \sum_{k=-\infty}^{\infty} a_k h_{n-k} + \sum_{k \neq n} b_k g_{n-k} \quad (13)$$

where $a_n$ and $b_n$ are the transmitted signal components and the summation terms are interference components.

A convenient measure of total distortion D is defined as $$D = \sum_{\substack{j=-\infty \\ j \neq 0}}^{\infty} |g_j| + \sum_{j=-\infty}^{\infty} |h_j| \quad (14)$$

Then, assuming that $g_0$ is normalized at unity and that the system is four phase for simplicity, equations (12) and (13) can be manipulated to yield $$|a_n - a_n'| \leq 0.707 D$$
$$|b_n - b_n'| \leq 0.707 D \quad (15)$$

Distortion D is a measure of the intersymbol interference occurring in the received signal. The quantity (1−D) becomes then a measure of the margin against noise. Accordingly, received symbols are decoded correctly as long as D is less than unity. The concept of distortion D is applicable alike to multiphase as well as to four-phase data systems.

Let the in-phase and quadrature tap coefficients be $c_n$ and $d_n$, respectively. Then, for a received pulse with samples $g_j$ and $h_j$ taken at the input of the equalizer, the equalizer output samples $g_j'$ and $h_j'$ are $$g_j' = \sum_{n=-N}^{N} c_n g_{j-n} - \sum_{n=-N}^{N} d_n h_{j-n} \quad (16)$$

$$h_j' = \sum_{n=-N}^{N} d_n g_{j-n} + \sum_{n=-N}^{N} c_n h_{j-n} \quad (17)$$

Each tap coefficient $(c_n, d_n)$, it may be noted, appears in each of equations (16) and (17).

The following properties are found to be inherent in the passband equalizer for phase-modulated data systems:

1 The distortion D is a convex function of the adjustable tap gains $c_n$ and $d_n$, i.e., only one absolute minimum exists and each tap adjustment converges independently toward the realization of that minimum.

2 When distortion D is less than unity, i.e., the peak amplitude of an isolated received pulse exceeds the sum of its leading and lagging echoes, then a. D can be minimized by forcing to zero those samples of the system pulse response corresponding to the adjustable tap gains $c_n$ and $d_n$;

b. the sign of the difference between the actual tap setting $(c_n, d_n)$ and the optimum tap setting $(c_n', d_n')$ is equal to the sign of the corresponding received sample value, i.e., $$\text{sgn }(c_n - c_n') = \text{sgn } g_n, \text{ and} \quad 18$$

$$\text{sgn }(d_n - d_n') = \text{sgn } h_n; \text{ and } 19.$$

c. the adjustment algorithm, which converges to the optimum tap settings regardless of the initial tap settings assuming that the $g_0$ sample is unity, is $$\Delta c_0 = 1 - g_0', \quad 20.$$

$$\Delta c_j = -g_j', \text{ for } j \neq 0 \quad 21.$$

$$\Delta d_j = -h_j' \text{ for all } j. \quad 22.$$

In equations (20), (21) and (22) the primes denote equalizer output pulse samples for a given set of tap states and deltas denote changes to be made in the tap settings.

If polarities alone of output samples $g_j'$ and $h_j'$ are available, equations (18) and (19) define an algorithm for adjusting the attenuators to proper values in discrete incremental steps. However, actual values of $g_j'$ and $h_j'$ provide a basis for proportional tap adjustment in accordance with equations (20) through (22). These polarities and values can be applied to preset the equalizer tap settings based on the transmission of isolated test pulses.

Adaptive equalization of a phase-modulation data transmission system can also be accomplished in accordance with the above equations during the course of data transmission, using only incoherent information, i.e., information derived from the signal itself without the aid of local reference waves.

In the decoding process at the receiver consecutive in-phase and quadrature-phase samples of the type defined in equations (8) and (9) are correlated to yield an in-phase function $$I(kT) = a(kT)a(kT-T) + b(kT)b(kT-T) \quad 23$$

and a quadrature function $$Q(kT) = b(kT)a(kT-T) - a(kT)b(kT-T). \quad 24$$

In the absence of distortion and assuming that no amplitude modulation occurred in the transmitted symbols $$I(kT) = \cos[\theta(kT) - \theta(kT-T)] = \cos \Delta\theta_k \quad 25$$

$$Q(kT) = \sin[\theta(kT) - \theta(kT-T)] = \sin \Delta\theta_k. \quad 26$$

The allowable phase angles $\Delta\theta_k$ are discrete, i.e., typically multiples of 22.5 or 45°. Equations (25) and (26) can thus be interpreted as vectors. The actual received signals are also vectors. An error signal between the actual received vector and the nearest allowable vector can be represented by the projection of the received vector $[I(kT), Q(kT)]$ onto a third vector $(-\sin \Delta\theta_k, \cos \Delta\theta_k)$ normal to the nearest allowable vector $(\cos \Delta\theta_k, \sin \Delta\theta_k)$. Thus, the error signal is $$E_k = \cos(\theta_k - \theta_{k-1}) Q(kT) - \sin(\theta_k - \theta_{k-1}) I(kT), \quad 27$$

where $k$ = index of received signals.

The sign of the error signal is determined by whether the received signal leads or lags the discrete signal, as diagrammed in FIG. 2.

By combining equations (25) through (27) there can be derived a set of correlations between the error signal $E_k$ and the sines and cosines of difference angles $\Delta\theta_k$ observed among successively sampled signals. Thus, for leading (+) taps [recalling equations (20) through (22)] proper adjustments of representative taps $c_p$ and $d_p$ can be obtained from $$g_p = 2E\{E_k \sin(\theta_{k-1} - \theta_{k-1-p})\} \qquad 28$$

$$h_p = 2E\{-E_k \cos(\theta_{k-1} - \theta_{k-1-p})\}. \qquad 29$$

Similarly, for lagging (−) taps $$g_{-p} = 2E\{E_k \sin(\theta_{k-p} - \theta_k)\} \qquad 30$$

$$h_{-p} = 2E\{E_k \cos(\theta_{k-p} - \theta_k)\}, \qquad 31$$

where $p$ = index of taps, and
$E\{\}$ = the average of a series of random events defined within the curved brackets.

According to equations (28), the contribution of the first tap leading the reference tap of the equalizer to the in-phase signal will be adjusted to equal the average product of the error signal $E_k$ and the sine of the difference in-phase angle between the second and first preceding phase angles. The other equations are of similar import.

Inasmuch as equations (27) through (29) require at each tap analog multiplication, which is relatively difficult to implement, the embodiment disclosed here uses quantized values for the error signal and the sine and cosine terms. Quantization becomes permissible because of the convergence properties of the equalization algorithm. The error signal $E_k$ is therefore quantized into two polarity levels, positive and negative, as suggested by the vector diagram of FIG. 2. Received symbols, on the other hand, are quantized into three levels: positive, zero and negative. Angles whose sine or cosine is zero are quantized to zero; otherwise, the actual sign depending on quadrant is used. With the quantized values multiplication is reduced to modulo-two addition, which is capable of implementation with Exclusive-OR gates. The occurrence of the zero state is employed, however, to inhibit the Exclusive-OR function.

Figure 8:
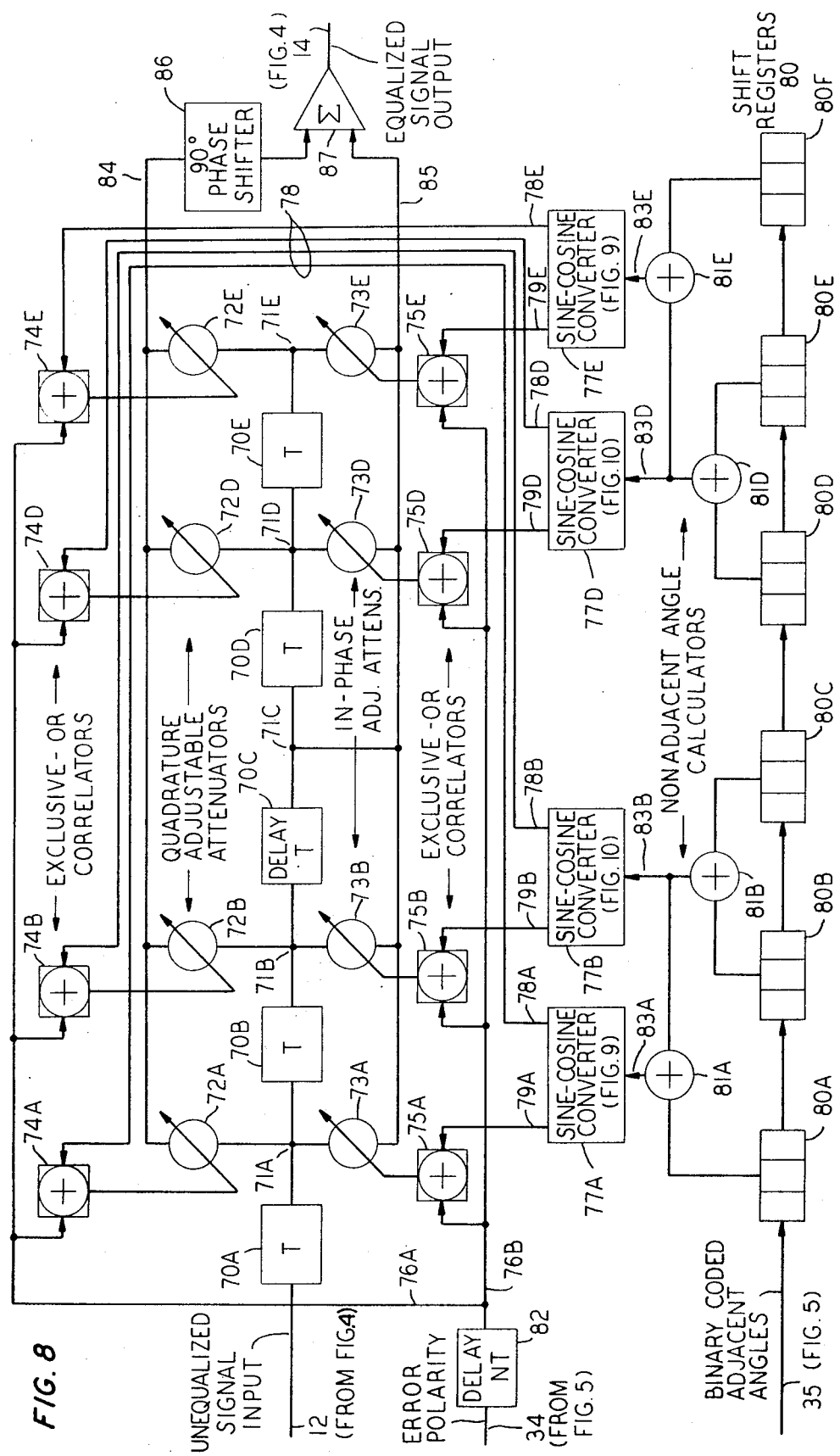
FIG. 8 is a block diagram of an automatic equalizer for phase-modulated data transmission systems according to this invention.

FIG. 8 is a block schematic diagram of a five-tap equalizer employing the principles of this invention in a phase-modulated data transmission system of the type shown in FIG. 4. FIG. 8 specifically implements block 13 in FIG. 4. The equalizer illustrated in FIG. 8 comprises tandem-connected delay units 70 with taps 71 therebetween, an in-phase adjustable attenuator 73 connecting each tap 71 to a first summing bus 85, a quadrature adjustable attenuator 72 connecting each tap 71 except a reference tap 71C to a second summing bus 84, a broadband 90° phase shifter 86 for signals on bus 84, a summing amplifier 87 combining direct signals on bus 85 with signals on bus 84 phase shifted by 90° in shifter 86, and Exclusive-OR gate correlator associated with each attenuator 72 and 73 and having as one common input an error polarity signal, a fixed delay unit 82 for aligning the error polarity signal in time with reference tap 71C, a sine-cosine converter 77 for each tap to quantize respective in-phase and quadrature received signal samples, a shift register for storing demodulated phase changes associated with received signals and adder circuits 81 for computing nonadjacent phase angles existing between received signals. Incoming phase-modulated data signals in the transmitted passband are received on lead 12 and applied to the input of first delay unit 70A. Error polarity signals from the sixth cell of frequency counter 32 in FIG. 5 are applied to fixed delay unit 82 by way of lead 34. Delay unit 82 is provided with a delay N times the baud interval T, where N is the number of units of delay between the input of delay line 70 and the reference tap. In the embodiment of FIG. 8 the value of N is three. The equalized passband output signal appears at the output of summing circuit 87 on lead 14, which also appears in FIG. 4.

The operation of FIG. 8 is such that an array of time-spaced samples of the received signal appears at taps 71A through 71E. The signal samples at each of these taps are operated on by a first set of factors which are implemented by adjustable attenuators 73A through 73E to form a composite normalized main response and equalized in-phase echo components on bus 85. Similarly the same signal samples are operated on by a second set of factors which are implemented by adjustable attenuators 72A through 72E to form composite equalized quadrature-phase echo components on bus 84. Signals at reference tap 71C are directly applied to bus 85. The composite signals on buses 84 and 85 are further combined in mutual quadrature relationship to form an overall equalized passband signal.

The respective in-phase and quadrature control signals for attenuators 73 and 72 are derived in correlators 75 and 74 by modulo-two addition of the delayed error polarity signals on buses 76A and 76B to quantized sine and cosine components of phase angle differences. Correlators 74 and 75 advantageously include integrators (not shown) to fully implement equations (28) through (31). The inputs to sine-cosine converters 77A through 77E are obtained on cables 83A through 83E. Cables 83 include a sufficient number of leads to transmit in parallel the two or more digits required to encode the phase angle differences. The outputs of converters 77 appear as quantized sines and cosines of the phase angle differences on respective leads 79 and 78. The sine components on leads 79A through 79E are correlated with the error polarity signal on bus 76B in correlators 75A through 75E to control in-phase attenuators 73A through 73E. The cosine components on leads 78A through 78E similarly are correlated with the error polarity signal on bus 76A in correlators 74A through 74E to control quadrature attenuators 72A through 72E.

Shift register 80 comprises sufficient cells in tandem to store in clusters 80A through 80F one more binary coded adjacent phase angle than there are equalizer taps. Adders 81A through 81E are provided to add the digits representing adjacent phase angle differences to form nonadjacent phase angle differences and thereby to contribute to the implementation equations (28) through (31). FIG. 9 is a logic diagram representing a practical embodiment of a sine-cosine converter and quantizer useful for implementing blocks 77 in FIG. 8, where only odd multiples of 22.5° are involved as at odd-ordered taps such as 71A and 71E. The required information is obtained from the two most significant bits A' and B' of the binary encoded phase angle differences. Accordingly, the converter of FIG. 9 comprises Exclusive-OR gate 92 and two inverters 93A and 93B. Encoded bits on input leads 90 and 91 are combined modulo-two in gate 92 and inverted to form a quantized output on lead 78. This output represents the sign of the cosine of the phase difference $\Delta\theta$. Since zero and 90° angles do not occur as odd multiples of 22.5°, no inhibit function is necessary. A study of the binary phase angle table of FIG. 6 confirms this.

FIG. 10 is a logic diagram representing a practical embodiment of a sine-cosine converter and quantizer useful for angles which are even multiples of 22.5°, such as occur at even-ordered taps, such as 71B and 71D in FIG. 8. For these angles an inhibit function is required when the zero or 90° angle occurs. It becomes necessary to take the third most significant bit C' into account. Accordingly, the required implementation comprises Exclusive-OR gate 104 operating on the A' and B' bits; AND-gates 106, 108, 112, and 114 controlled by an inverted C' bit; and inverters 105, 107, 110, and 111. The cosine of the phase angle difference is taken from modulo-two addition of the A' and B' bits on input leads 101 and 102 in Exclusive-OR gate 104 and inversion in inverter 105. However, the occurrence of the 90° or 270° angle, indicated as shown in FIG. 6 when B' is unity and C' is zero, requires inhibiting the output from lead 78. Thus, the C' bit is inverted in inverter 107 and combined with the B' bit in AND-gate 108 and, after further inversion in inverter 109, blocks AND-gate 106. Similarly, the sine quantization is inhibited at lead 79 when the B' and C' bits are zero, corresponding to angles of zero and 180° as shown in FIG. 6. Inverters 107, 110, 111, and 113 and AND-gates 112 and 114 are employed in a straightforward manner as shown in FIG. 10 to accomplish the sine-inhibit function.

Inasmuch as the automatic adaptive equalizer of FIG. 8 is digitalized, it is preferable to make attenuators 72 and 73 in FIG. 8 incrementally adjustable with the size of the increment selected to match the sensitivity desired. However, as a feature of this invention it is relatively easy to vary the size of the increment depending on the magnitude of the error. As shown in FIG. 5, the magnitude of the error is encoded in the states of lesser significance of the frequency counter 32. Accordingly, the error magnitude bits can be weighted in binary fashion, as shown in FIG. 11, to form an analog magnitude for application to a threshold device (not shown) to be associated with the several attenuators to select a range of step sizes depending on the magnitude of the error. In FIG. 11 the analog-to-digital converter comprises a summing amplifier 122 having the least significant error bit as an input on lead 120 and successively higher bits weighted by binary dividers such as 121A to 121N. The corresponding analog summation is obtained from amplifier 122 on output lead 123.

While this invention has been described in terms of a specific illustrative embodiment, the principles thereof are susceptible of wide application by those skilled in the equalizer art.

What is claimed is:

1. In combination with a synchronous phase-modulation data transmission system, an automatic adaptive transversal equalizer comprising
   a delay line with synchronously spaced taps therealong accepting at an input data signal received from said system,
   a first and second set of adjustable attenuators at each of said taps,
   means for combining the outputs of said first set of attenuators in quadrature with the outputs of said second set of attenuators to form an equalized passband received signal,
   means for demodulating the phase angle changes between adjacent synchronous samples of said equalized signal, said phase angle changes representing first demodulated data signals and the departure of a demodulated phase angle change from predetermined discrete phase angle changes constituting an error signal,
   means for storing a plurality of first data signals from said demodulating means,
   means for summing pairs of said first data signals from said storing means to obtain a plurality of second data signals representing nonadjacent phase angle changes,
   means for converting said first and second data signals into sine and cosine signals representing the sine and cosine values of demodulated phase angle changes, and
   means for correlating respective sine and cosine signals with said error signal to provide control signals for adjusting said first and second sets of attenuators in a direction to minimize said error signal.

2. The combination defined in claim 1 in which said combining means comprises a first bus to which all outputs of said first set of attenuators are applied, a second bus to which all outputs of said second set of attenuators are applied, and broadband quadrature phase-shifting means in series with one of said first and second buses.

3. The combination defined in claim 1 in which said combining means comprises a bus to which all outputs of said first set of attenuators are directly connected, quadrature phase-shifting means for each output of said second set of attenuators and means for applying the outputs of said phase-shifting means to said bus.

4. The combination defined in claim 1 in which said demodulating means comprises
   a stable oscillator for generating a reference wave whose frequency is integrally related by a power of two to that of the carrier wave whose phase encoder data signals are to be demodulated,
   a frequency counter driven by said reference wave and having a plurality of stages equal in number to said power of two, the binary states of the stages thereof representing a count of the number of cycles of said reference wave incident thereon with respect to a reset condition,
   resetting means for said frequency counter responsive to a sampling pulse coincident with the occurrence of a zero crossing of a predetermined sense nearest the center of a data signaling interval, and
   readout means for storing the most significant states of said frequency counter just prior to resetting as a measure of the phase angle changes between consecutive data signaling intervals.

5. The combination defined in claim 4 in which said demodulating means further comprises a clock source providing a synchronizing pulse substantially at the center of each data signaling interval,
   means jointly responsive to said synchronizing pulse and a transition in a received data signal for generating a sample pulse, and
   gating means responsive to said sampling pulse for controlling the transmission of the reference wave from said oscillator to said frequency counter.

6. The combination defined in claim 1 in which said storing means comprises a multistage shift register.

7. The combination defined in claim 1 in which each of said pair-combining means comprises a binary full adder.

8. The combination defined in claim 1 in which said converting means comprises
   input means for the data signal bits representing phase angle changes,
   first means for combining modulo-two the two most significant data signal bits to form a first control signal representative of the algebraic sign of the cosine of the angle of phase change,
   second means for combining the second and third most significant data signal bits to generate an inhibit signal equivalent to a zero value of the cosine of the angle of phase change,
   means for inverting the most significant data signal bit to form a second control signal representative of the algebraic sign of the sine of the angle of phase change, and
   third means for combining the inverted second and third most significant data signal bits to generate an inhibit signal equivalent to a zero value of the sine of the angle of phase change.

9. The combination defined in claim 1 in which said correlating means comprise a plurality of Exclusive-OR gates, one for each adjustable attenuator.

* * * * *